United States Patent Office 3,028,248
Patented Apr. 3, 1962

3,028,248
DIELECTRIC CERAMIC COMPOSITIONS AND THE METHOD OF PRODUCTION THEREOF
Raymond Malcolm Glaister, Shepperton, England, assignor to National Research Development Corporation, London, England, a British corporation
No Drawing. Filed Nov. 28, 1958, Ser. No. 776,739
16 Claims. (Cl. 106—39)

The present invention relates to ceramic materials for dielectrics for electrical capacitors.

Existing types of ceramic dielectrics may be made with dielectric constants of 100,000 or more but having high power factors.

It is an object of the present invention to produce a ceramic dielectric of the barrier layer variety with a dielectric constant of the order of 100,000 or higher and relatively low power factor.

According to the present invention, a method of manufacturing barrier layer ceramic dielectric material includes the steps of making powdered barium titanate of high purity into a form, firing the form in a reducing atmosphere at a temperature between 1330° C. and 1550° C. until substantially all the barium titanate is transformed to its hexagonal polymorph, cooling the form, cooling over the temperature range of approximately 1330° C. to 1000° C. taking place in approximately one hour or less and then firing the form in an oxidizing atmosphere for one to five hours at a temperature between 1000° C. and 650° C. The reducing atmosphere preferably consists of hydrogen. The oxidizing atmosphere is an oxygen-containing atmosphere such as pure oxygen or air and is preferably at atmospheric pressure. The firing in a reducing atmosphere is preferably undertaken at a temperature of approximately 1450° C. at atmospheric pressure. During the reduction process, the barium titanate is reduced and sinters to form a ceramic.

The firing of the form in an oxidizing atmosphere is preferably undertaken at a temperature of approximately 800° C. During the oxidation process, a barrier layer is formed on the grains of barium titanate, the barrier layer having a high electrical resistance at low electric fields of the order of 10 volts per centimetre thickness of the ceramic material.

It has been found that by using a barrier layer type ceramic material manufactured in the above-described manner under carefully controlled conditions, low working voltage capacitors can be produced having certain desirable features, namely large capacity for small size due to the high dielectric constant of the ceramic dielectric, and a reasonably low power factor and a wide working temperature range.

The ceramic dielectric is manufactured preferably in the following manner. Powdered barium titanate ($BaT_iO_3$) of high purity, that is to say of the order of 99% purity, is made into compresses or forms such as discs, plates or tubes (which may be of the order of 0.25 mm. thick or more) in a die press. These discs, plates or tubes are placed in molybdenum boats or on molybdenum sheet and fired at a temperature between 1330° C. and 1550° C. (preferably at 1450° C.) in a reducing atmosphere to effect reduction of the material and the formation of ceramic and at the same time to effect transformation of the barium titanate from its tetragonal polymorph to its hexagonal polymorph. This reduction treatment is continued until substantially all of the barium titanate is transformed from the tetragonal polymorph to its hexagonal polymorph. The time taken for this transformation to take place depends upon the temperature employed. For example, at 1500° C. the transformation may take place in less than an hour whilst at 1345° C. the transformation may take place in about one hour. Preferably, the transformation process is undertaken at 1450° C. for two to five hours. The reducing atmosphere is preferably hydrogen.

The discs or plates are then allowed to cool. Over the temperature range 1330° C. to 1000° C., the cooling is carried out in preferably one hour or less. Unless reoxidation is to take place, the cooling must, of course, take place in the reducing atmosphere. The rapid cooling rate of the discs over the temperature range 1330° C. to 1000° C. helps to ensure that appreciable reconversion from the hexagonal to the tetragonal or a cubic polymorphic form does not occur.

During the reduction process the normal ferro-electric tetragonal form of the barium titanate is transformed, as already stated, to the non-ferro-electric hexagonal form, which while having the disadvantage of a lower dielectric constant over the normal tetragonal form has the advantages of giving a lower power factor, and of substantially eliminating the complex behaviour of the electrical resistivity of the ceramic associated with the Curie point of the tetragonal form.

Barium titanate of high purity is initially required in the process since certain impurities such as strontium and silica inhibit the transformation from the tetragonal to the hexagonal polymorphic form at the reduction process temperatures preferably employed. The barium titanate may be prepared from barium carbonate and titanium dioxide both of high purity. Such preparation, if it is undertaken, is preferably made before the reduction process. However, an intimate mixture of powdered barium carbonate and powdered titanium dioxide in the appropriate stoichiometric proportions may be used as a starting material for the reduction process. The reduction of such an intimate mixture is not, however, easily controllable and may result in some over-reduction of the material.

After the reduction process the dielectric discs, plates or tubes are fired in an oxygen or air atmosphere at a temperature which may be of the order of 800° C. but this temperature may be varied over quite large limits (say, 650° C. to 1000° C.) for differing periods varying from one hour to about five hours. The maximum temperature which can be used is limited by the reconversion temperature from the hexagonal to the tetragonal polymorphic forms. The temperature, firing time and the gas pressure are mutually interdependent and suitable oxidation, or the requisite thickness of barrier layer, depends on the oxygen diffusion rates into the dielectric discs. The firing temperature and the density of the ceramic body also effect these diffusion rates. During the oxidation process the granules of barium titanate, which may be of the order of 1 micron diameter, become surrounded by a barrier layer of extreme thinness i.e. of the order of 100 Angstrom units, although the barium titanate core and the barrier layer may not be sharply defined. This barrier layer dielectric is a non-homogeneous, but normally isotropic dielectric in which the bulk of the material is substantially electrically conductive but is in the form of grains mutually isolated by thin films or barriers of insulating material.

The deposition of electrodes on the dielectric plates, discs or tubes is preferably carried out between the reducing and oxidising processes by sputtering platinum on opposite surfaces of the plates, discs or tubes, since an intimately adhering electrode is required. Other sputtered electrode materials may be used but materials other than platinum tend to reduce the temperature range over which the reduced barium titanate may be oxidised, necessitating longer oxidation times.

Metallizing paints which are subsequently stoved are preferably not used as they may alter the state of oxidation of the barium titanate, and also the subsequent oxidation process may cause deterioration of the electrode. The electrodes may, however, be applied towards the end of the oxidising process by the metallising paint method during the last part of the oxidation process. The final oxidation of the barium titanate and the stoving of the metallising paint is done simultaneously.

A ceramic dielectric disc produced by the method hereinbefore described had a value of dielectric constant of 100,000 and a dielectric loss tan $d=.033$ at 1000 cycles per second and 5 volts R.M.S., $d$ being the loss angle.

I claim:

1. A method of manufacturing intergranular barrier layer ceramic dielectric material including the steps of making powdered barium titanate of high purity, and substantially free from impurities inhibiting the transformation of barium titanate from its tetragonal polymorph to its hexagonal polymorph, into a form, firing the form in a reducing atmosphere substantially free from oxidizing agents at a temperature between 1330° C. and 1550° C. until substantially all the barium titanate is transformed into a porous mass of its hexagonal polymorph, cooling the form, cooling over the temperature range of substantially 1330° C. to 1000° C. taking place in a reducing atmosphere in substantially one hour and then firing the form wholly in an oxidizing atmosphere for one to five hours at a temperature between 1000° C. and 650° C.

2. A method of manufacturing intergranular barrier layer ceramic dielectric material as claimed in claim 1 and wherein the form is fired in the reducing atmosphere for at least one hour.

3. A method of manufacturing intergranular barrier layer ceramic dielectric material as claimed in claim 1 and wherein the form is fired in the reducing atmosphere at a temperature of substantially 1450° C. for two to five hours.

4. A method of manufacturing intergranular barrier layer ceramic dielectric material including the steps of making powdered barium titanate of high purity, and substantially free from impurities inhibiting the transformation of barium titanate from its tetragonal polymorph to its hexagonal polymorph, into a form, firing the form in a reducing atmosphere substantially free from oxidizing agents at a temperature between 1330° and 1550° C. until substantially all the barium titanate is transformed into a porous mass of its hexagonal polymorph, cooling the form, cooling over the temperature range of substantially 1330° C. to 1000° C. taking place in a reducing atmosphere in less than one hour and then firing the form wholly in an oxidizing atmosphere for one to five hours at a temperature of substantially 800° C.

5. A method of manufacturing intergranular barrier layer ceramic dielectric material as claimed in claim 4 and wherein the form is fired in the reducing atmosphere for at least one hour.

6. A method of manufacturing intergranular barrier layer ceramic dielectric material as claimed in claim 4 and wherein the form is fired at a temperature of substantially 1450° C. for two to five hours.

7. A method of manufacturing intergranular barrier layer ceramic dielectric material including the steps of making powdered barium titanate of high purity, and substantially free from impurities inhibiting the transformation of barium titanate from its tetragonal polymorph to its hexagonal polymorph, into a form, firing the form in a reducing atmosphere substantially free from oxidizing agents at a temperature of substantially between 1330° C. and 1550° C. until substantially all the barium titanate is transformed to a porous mass of its hexagonal polymorph, cooling the form, cooling over the temperature range of 1330° C. to 1000° C. taking place in a reducing atmosphere in substantially one hour, sputtering platinum electrodes on the form and then firing the form wholly in an oxidizing atmosphere for one to five hours at a temperature between 1000° C. and 650° C.

8. A method of manufacturing intergranular barrier layer ceramic dielectric material including the steps of making powdered barium titanate of high purity, and substantially free from impurities inhibiting the transformation of barium titanate from its tetragonal polymorph to its hexagonal polymorph, into a form, firing the form in a reducing atmosphere substantially free from oxidizing agents at a temperature of substantially 1450° C. for two to five hours to form a porous mass, cooling the forms, cooling over the temperature range of 1330° C. to 1000° C. taking place in a reducing atmosphere in less than one hour, sputtering platinum electrodes on the form and then firing the form wholly in an oxidizing atmosphere for one to five hours at a temperature of substantially 800° C.

9. A method of manufacturing intergranular barrier layer ceramic dielectric material including the steps of making powdered barium titanate of high purity, and substantially free from impurities inhibiting the transformation of barium titanate from its tetragonal polymorph to its hexagonal polymorph, into a form, firing the form in a reducing atmosphere substantially free from oxidizing agents at a temperature between 1330° C. and 1550° C. until substantially all the barium titanate is transformed into a porous mass of its hexagonal polymorph, cooling the form, cooling over the temperature range of substantially 1330° C. to 1000° C. taking place in a reducing atmosphere in at the most one hour and then firing the form wholly in an oxidizing atmosphere for one to five hours at a temperature between 1000° C. and 650° C.

10. A method of manufacturing intergranular barrier layer ceramic dielectric material as claimed in claim 4 and wherein the reducing atmosphere is hydrogen.

11. A method of manufacturing intergranular barrier layer ceramic dielectric material as claimed in claim 8 and wherein the reducing atmosphere is hydrogen.

12. A method of manufacturing intergranular barrier layer ceramic dielectric material as claimed in claim 9 and wherein the reducing atmosphere is hydrogen.

13. A method of manufacturing intergranular barrier layer ceramic dielectric material including the steps of making an intimate mixture of stoichiometric proportions of powdered barium carbonate of high purity and powdered titanium dioxide of high purity such as to form barium titanate substantially free from impurities inhibiting the transformation of barium titanate from its tetragonal polymorph to its hexagonal polymorph on combination, making the said mixture into a form, firing the form in a reducing atmosphere substantially free from oxidizing agents at a temperature between 1330° C. and 1550° C. until substantially all of the said mixture is transformed into a porous mass of the hexagonal polymorph of barium titanate, cooling the form, cooling over the temperature range of substantially 1330° C. to 1000° C. taking place in a reducing atmosphere in at the most one hour and then firing the form wholly in an oxidizing atmosphere for one to five hours at a temperature between 1000° C. and 650° C.

14. A method of manufacturing intergranular barrier layer ceramic dielectric material as claimed in claim 13 and wherein the step of firing the form in an oxidizing atmosphere is undertaken at a temperature of substantially 800° C.

15. A method of manufacturing intergranular barrier layer ceramic dielectric material as claimed in claim 14 and wherein platinum electrodes are sputtered on to the form after the form is cooled.

16. An intergranular barrier layer ceramic dielectric material comprising substantially conductive granules of the hexagonal polymorph of barium titanate, the said conductive granules being substantially insulated from one another by an intergranular barrier layer of an oxidized form of the said barium titanate.

References Cited in the file of this patent

UNITED STATES PATENTS

| | | |
|---|---|---|
| 2,520,376 | Roup et al. | Aug. 29, 1950 |
| 2,633,543 | Howatt | Mar. 31, 1953 |
| 2,821,490 | Dunegan | Jan. 28, 1958 |
| 2,841,508 | Roup et al. | July 1, 1958 |